UNITED STATES PATENT OFFICE.

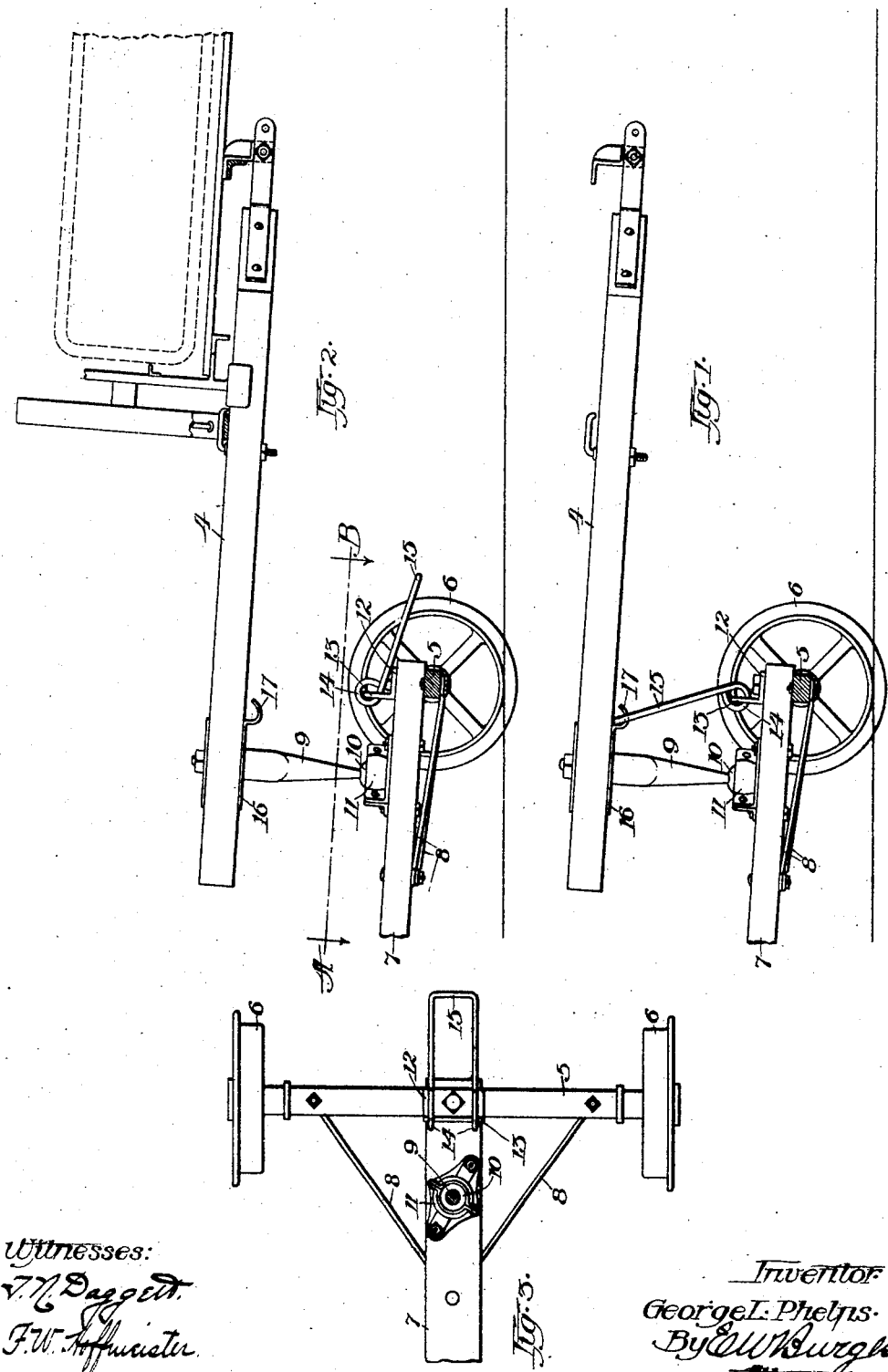

GEORGE L. PHELPS, OF CHICAGO, ILLINOIS, ASSIGNOR TO INTERNATIONAL HARVESTER COMPANY, A CORPORATION OF NEW JERSEY.

TONGUE-TRUCK FOR HARVESTERS.

No. 846,138.       Specification of Letters Patent.       Patented March 5, 1907.

Application filed October 22, 1906. Serial No. 339,922.

*To all whom it may concern:*

Be it known that I, GEORGE L. PHELPS, a citizen of the United States, residing at Chicago, in the county of Cook and State of Illinois, have invented certain new and useful Improvements in Tongue-Trucks for Harvesters, of which the following is a specification.

My invention relates to improvements in tongue-trucks for harvesters in which a stub-tongue is connected at its rear end with the harvester and has its forward end mounted upon the truck in a flexible manner, and a draft-tongue connected with the truck, the flexible connection between the truck and stub-tongue being such as to allow the draft-tongue and truck to move in any direction relative to the stub-tongue.

It is quite common to provide means whereby the harvester may be transported by mounting it upon supplemental carrying-wheels having their axes at right angles with the regular carrying and drive wheels of the machine, and providing means whereby the draft devices may be transposed from their normal operative position to the grainward end of the grain-platform; and the object of my invention is to facilitate the above transposition of parts by providing means whereby the connection between the stub-tongue and truck may be temporarily made substantially rigid while the draft devices are being transferred from one position to the other. I attain these objects by the mechanism illustrated in the accompanying drawing, in which—

Figure 1 is a side view of a tongue-truck attachment with stub-tongue and draft-tongue connected therewith and embodying my invention. Fig. 2 represents the attachment transposed to the grainward end of the platform for transportation purposes, and Fig. 3 is a plan view of the truck along the line A B of Fig. 2.

Similar numerals refer to similar parts throughout the several views.

4 represents the stub-tongue provided at its rear end with any preferred means by which it may be attached to the harvester or other implement.

5 is a truck-axle having carrying-wheels 6 loosely mounted at opposite ends thereof and a draft-tongue 7 secured thereto intermediate the wheels, and 8 represents the usual braces connecting the axle with the draft-tongue. A vertical standard 9 has its upper end secured to the forward end of the stub-tongue and is provided at its lower end with a ball 10, loosely mounted in a bearing 11 in a manner providing a universal-joint connection between the stub-tongue and the truck.

Secured to the rear end of the draft-tongue is a clip 12, having a vertically-disposed portion 13, provided with openings adapted to receive eye portions 14, formed upon the lower ends of the side members of a U-shaped link 15 in a manner permitting the link to swing in a vertical plane in line of the direction of draft.

Secured to the stub-tongue is a plate 16, having a hook-shaped portion 17, adapted to receive the upper end of the link 15 in a manner to temporarily render the connection between the stub-tongue and the truck substantially inflexible, as shown in Fig. 1.

In operation, when it is desired to transfer the draft attachment to the position shown in Fig. 2 the link is swung upward in a manner to engage the hook portion of the plate 16, and the parts are held in substantially rigid relation until the transfer is complete, when the link may be released from its locking position.

What I claim as my invention, and desire to secure by Letters Patent, is—

1. In a tongue-truck, the combination of a stub-tongue, a truck, a universal-joint connection between said stub-tongue and said truck, and means for temporarily making said connection substantially inflexible in a vertical plane.

2. In a tongue-truck, the combination of a stub-tongue, a truck, a universal-joint connection between said stub-tongue and said truck, a locking member carried by one of said flexibly-connected members and adapted to be moved into engagement with the other member, in a manner to render said connection substantially inflexible in a vertical plane.

3. In a tongue-truck, the combination of a stub-tongue, a truck, a universal-joint connection between said stub-tongue and said truck, a link pivotally connected with said truck and adapted to engage with the stub-tongue, when moved about its pivotal axis in one direction, in a manner to secure the tongue and truck in substantially fixed relation in a vertical plane with each other.

4. In a tongue-truck, the combination of a stub-tongue, a truck-axle, a draft-tongue secured to said axle, a universal-joint connection between said stub-tongue and said draft-tongue, a clip secured to said draft-tongue, a link having one end pivotally connected with said clip, and means for detachably connecting its opposite end with said stub-tongue in a manner to hold said stub-tongue and draft-tongue in substantially fixed relation in a vertical plane with each other.

5. In a tongue-truck, the combination of a stub-tongue, a truck-axle, a draft-tongue secured to said axle, a flexible connection between said stub-tongue and said draft-tongue, a clip secured to said draft-tongue, a U-shaped link having the lower ends of its side members pivotally connected with said clip and adapted to swing in a vertical plane in the direction of draft, and a hook-shaped plate secured to the stub-tongue and adapted to receive the upper end of said link.

GEORGE L. PHELPS.

Witnesses:
OSCAR A. ANDERSON,
S. I. SCHULTZ.